(12) United States Patent
Goehlich et al.

(10) Patent No.: US 9,138,958 B2
(45) Date of Patent: Sep. 22, 2015

(54) LIGHTWEIGHT STRUCTURE, PARTICULARLY PRIMARY AIRCRAFT STRUCTURE OR SUBASSEMBLY, AS WELL AS METHOD FOR THE MANUFACTURE THEREOF

(71) Applicant: Airbus Operations GmbH, Hamburg (DE)

(72) Inventors: Robert Alexander Goehlich, Hamburg (DE); Johannes Maslennikov, Hamburg (DE); Alexei Vichniakov, Hamburg (DE); Cihangir Sayilgan, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/671,725

(22) Filed: Nov. 8, 2012

(65) Prior Publication Data

US 2013/0115404 A1    May 9, 2013

Related U.S. Application Data

(60) Provisional application No. 61/556,856, filed on Nov. 8, 2011.

(30) Foreign Application Priority Data

Nov. 8, 2011    (DE) .......................... 10 2011 085 937

(51) Int. Cl.
*B32B 3/14*     (2006.01)
*B29C 65/00*    (2006.01)
(Continued)

(52) U.S. Cl.
CPC . *B32B 3/14* (2013.01); *B29C 65/00* (2013.01); *B29C 66/532* (2013.01);
(Continued)

(58) Field of Classification Search
CPC .. B29C 65/00; B29C 35/02; B29C 66/73752; B29C 70/30; B29D 99/0014; B32B 3/14; B32B 7/04; B32B 2605/18; B64C 1/068; B64C 1/12; B64C 2001/0072; Y02T 50/43; Y02T 50/433
USPC .......................... 428/44, 45; 156/63; 244/119
See application file for complete search history.

(56) References Cited

U.S. PATENT DOCUMENTS

| 5,888,608    | A  | 3/1999 | Tsai       |
|--------------|----|--------|------------|
| 2008/0185478 | A1 | 8/2008 | Dannenberg |

(Continued)

FOREIGN PATENT DOCUMENTS

DE    102006050534    4/2008
(Continued)

OTHER PUBLICATIONS

German Office Action, Sep. 18, 2014.
(Continued)

*Primary Examiner* — Maria Veronica Ewald
*Assistant Examiner* — Brian Handville
(74) *Attorney, Agent, or Firm* — Greer, Burns & Crain Ltd.

(57) ABSTRACT

A lightweight structure at least sectionally composed of a plurality of connected mosaic elements and/or skin mosaic elements. The lightweight structure allows an essentially load-appropriate arrangement of the mosaic elements and/or the skin mosaic elements including the optional skin. The lightweight structure requires a significantly reduced number of connecting elements, such that the assembly effort can be reduced and an additional weight reduction can be achieved. Also, two variations of a method for manufacturing a lightweight structure are provided. Large-format lightweight structures such as, for example, an aircraft fuselage cell or partial shells thereof can also be manufactured in a reliable and dimensionally accurate fashion because only mosaic elements and skin mosaic elements, with relatively small dimensions, need to be handled. Other applications of the lightweight structure include launch vehicles, rocket stages, space stations, space station modules, satellites and masts or towers of wind power plants.

9 Claims, 5 Drawing Sheets

(51) Int. Cl.
*B32B 7/04* (2006.01)
*B29D 99/00* (2010.01)
*B29C 70/30* (2006.01)
*B64C 1/06* (2006.01)
*B64C 1/12* (2006.01)
*B29C 35/02* (2006.01)
*B64C 1/00* (2006.01)

(52) U.S. Cl.
CPC .......... *B29C 66/73752* (2013.01); *B29C 70/30* (2013.01); *B29D 99/0014* (2013.01); *B32B 7/04* (2013.01); *B64C 1/068* (2013.01); *B64C 1/12* (2013.01); *B29C 35/02* (2013.01); *B32B 2605/18* (2013.01); *B64C 2001/0072* (2013.01); *Y02T 50/433* (2013.01); *Y10T 428/16* (2015.01); *Y10T 428/161* (2015.01)

(56) References Cited

U.S. PATENT DOCUMENTS

| | | | | |
|---|---|---|---|---|
| 2009/0277994 | A1* | 11/2009 | Lobato et al. | 244/119 |
| 2010/0237195 | A1* | 9/2010 | Stephan | 244/132 |
| 2012/0141703 | A1 | 6/2012 | Goetze | |
| 2012/0183716 | A1* | 7/2012 | Jordan et al. | 428/47 |

FOREIGN PATENT DOCUMENTS

| | | |
|---|---|---|
| DE | 102008041230 | 2/2010 |
| DE | 102008041259 | 2/2010 |
| DE | 102009060876 | 7/2011 |

OTHER PUBLICATIONS

German Office Action, Jun. 28, 2013.

* cited by examiner

LIGHTWEIGHT STRUCTURE, PARTICULARLY PRIMARY AIRCRAFT STRUCTURE OR SUBASSEMBLY, AS WELL AS METHOD FOR THE MANUFACTURE THEREOF

BACKGROUND OF THE INVENTION

The invention pertains to a lightweight structure, particularly a primary aircraft structure or a subassembly.

Aircraft fuselage cells in conventional aluminum construction are composed, for example, of four partial shells that are respectively joined into an approximately hollow-cylindrical fuselage section or a "fuselage barrel." A plurality of consecutively arranged and interconnected fuselage sections is then assembled into the aircraft fuselage cell. In well-known monocoque construction, structural components such as, in particular, stringers, frames, angle brackets, skins, etc., of light alloys and/or of composite fiber materials are integrated into aircraft fuselage cells. Fuselage barrels may be alternatively manufactured of pre-impregnated, strip-shaped composite fiber materials (e.g., "prepreg" material, textiles, thermosetting polymers, thermoplastic polymers, etc.) by means of winding processes. It is furthermore known from the prior art to brace aircraft fuselage cells or similar lightweight structures of usually cylindrical or conical shape with a uniform grid of reinforcing elements ("Isogrid").

In monocoque construction, stringers (longitudinal reinforcements) and angle brackets are placed on the partial shells and then riveted or welded thereto in order to reinforce the aircraft fuselage cell. Subsequently, frame segments are placed on the partial shell, aligned and riveted to the stringers and the skin by means of the angle brackets. The partial shells are then joined into a fuselage barrel by respectively arranging these partial shells such that they overlap one another by a few centimeters and a longitudinal seam (longitudinal joint) is created and then riveting the partial shells to one another. The thusly produced fuselage barrels are then pushed together, aligned relative to one another and respectively connected to one another by means of butt straps such that a transverse seam (butt joint) is formed. The stringers, as well as the frames, respectively are non-positively interconnected by means of couplings riveted thereon. At the end of the assembly process, brackets ("A, B and C brackets") for the system installation in the structural assembly are positioned and mounted at the corresponding locations of the fuselage cell structure in dependence on the respective customer requirements.

However, the conventional methods for the construction of aircraft fuselage cells have a variety of inherent disadvantages. A statically unnecessary weight increase results from the overlapping design of the longitudinal and transverse seams. In addition, these methods complicate the utilization of novel production equipment that is able to assemble the stringers and frames in the form of an integral construction, i.e., particularly without couplings, in order to economically manufacture, for example, partial shells of great lengths. The latter-mentioned aspect is particularly important in view of the fact that composite fiber materials (e.g., CFRP) are increasingly utilized for structural components of aircraft fuselage cells. The use of the conventional riveting technology furthermore results in a weakening of the structure due to the required bores, in a weight increase due to the large number of required rivets, in sealing and corrosion problems, as well as in a higher manufacturing effort. In addition, the bracket installation in the fuselage cell is complicated, as well as time-consuming and cost-intensive with respect to the manufacturing technology, due to the broad variation of customer-specific adaptations.

Furthermore, particularly the stringers and the (annular) frames always respectively extend essentially parallel to the longitudinal aircraft axis and transverse thereto. In an aircraft fuselage cell realized in the form of a four-shell construction, however, the shells are subjected to very different mechanical load profiles in dependence on the operating state of the aircraft. For example, the lateral shells are usually subjected to high shear stresses while the top shell and the bottom shell are acted upon with compressive loads. However, a fuselage cell that is composed of a periodic grid-like sequence of stringers, frames and a skin cannot cope with the recorded differentiated load profile during the operation of an aircraft. This applies analogously to known reinforcing structures in other technological fields such as, for example, space travel, shipbuilding, automotive engineering and conventional or regenerative power engineering.

DE 10 2006 050 534 A1 discloses an integrated system of electrical and/or optical lines for an aircraft. On skin panels of fiber-reinforced plastic materials, the lines can be directly embedded into the fiber reinforcement and/or into the surrounding resin matrix. However, the aircraft fuselage cell is conventionally composed of skin panels, frames, stringers, angle brackets, etc., that represent a regular, repetitive three-dimensional structure.

SUMMARY OF THE INVENTION

It is the objective of the invention to develop a universal lightweight structure that makes it possible to absorb and distribute all occurring forces in an essentially optimal fashion in order to simultaneously achieve a particularly high mechanical load bearing capacity and a low weight.

Particularly a load-appropriate design of the inventive lightweight structure that simultaneously has a lower weight and a higher mechanical stability than a conventional lightweight structure—such as, for example, an aircraft fuselage cell with regularly arranged reinforcing elements—is achieved due to the fact that the lightweight structure is at least sectionally realized with a plurality of connected mosaic elements and/or skin mosaic elements. The (skin) mosaic elements may, in principle, be realized with any three-dimensional shape that has a sufficient static load bearing capacity individually or in connection with other (skin) mosaic elements.

A predetermined geometry of the lightweight structure is realized by successively arranging mosaic elements and/or skin mosaic elements among one another. The mosaic elements of the lightweight structure may in their entirety replace, for example, stringers, frames, angle brackets, stringer and frame couplings, as well as longitudinal joint and transverse joint butt straps, of conventional fuselage cell structures while the skin mosaic elements can additionally fulfill the function of a conventional fuselage cell skin. However, not only a complete primary aircraft structure or subassemblies thereof such as, for example, fuselage cells, fuselage sections, partial shells, airfoils, rudder units, rudders, landing flaps, aerodynamic lift systems, engine pylons, window and door frames, floors, etc., can be realized with the aid of the lightweight structure. In fact, the lightweight structure can be advantageously utilized in many other technical fields of application such as, for example, space travel, shipbuilding, automotive engineering or power engineering. For example, launch vehicles, rocket stages, space stations, space station modules, satellites and masts or towers of wind power plants may be entirely or partially realized with the lightweight mosaic structure.

The inventive lightweight mosaic structure furthermore opens up new options with respect to tolerance compensation. In conventional monocoque construction, individual tolerances caused by the manufacturing technology add up to a disadvantageous assembly tolerance while the individual tolerances of the (skin) mosaic elements can be easily compensated during the joining of the mosaic structure due to the finer segmenting of the (skin) mosaic elements in connection with a position control. As a result, the assembly tolerance can be minimized due to the large number of joints. Conventional or enhanced technologies such as, for example, fully automated shimming, dimensional changes of the (skin) mosaic elements during the curing process, etc., may be utilized in order to compensate occurring gaps.

According to an enhancement of the lightweight structure, it is proposed that an arrangement, geometry and/or size of the mosaic elements and the skin mosaic elements vary in order to achieve an essentially optimal absorption and distribution of all occurring forces.

Due to this load-appropriate orientation and/or grid arrangement of the mosaic and skin mosaic elements, all forces can be optimally absorbed and distributed by the lightweight structure. For example, a shear stress that frequently occurs in lateral shells can be better absorbed by a correspondingly aligned mosaic structure. This results in a significant weight saving potential and the increase in the mechanical load bearing capacity of the lightweight structure. The arrangement, the geometry and/or the size of the (skin) mosaic elements can be determined, for example, by means of the FEM ("Finite Element Method"). In addition, the processing times for the manufacture of the lightweight structure that may comprise, for example, an aircraft fuselage cell are reduced because the elaborate riveting of stringers, frames, couplings, skins, etc., is eliminated and the assembly is respectively realized with mosaic elements and skin mosaic elements that have simple, standardized basic shapes and/or sizes.

The mosaic structure can furthermore be adapted for absorbing internal fuselage loads as they are, for example, introduced into the primary structure by other structural components (floor, wing box, pressure shields), cabin equipment elements (cabin trim, brackets, support rails) and technical devices (power supply, air supply, water supply). Another advantage of the mosaic structure can be seen in the simplified installation of the above-described assemblies because the mosaic structure can be adapted to a predetermined routing of ducts and lines in a relatively simple fashion.

According to another advantageous embodiment of the lightweight structure, the skin mosaic elements respectively have a base area that is bordered by a peripheral frame. The frames in connection with the base areas that statically act as a plate cause a high inherent stability of the skin mosaic elements. The base areas may be plane or at least sectionally curved at least one-dimensionally such that lightweight structures with a plane or at least one-dimensionally curved surface geometry can be assembled. Furthermore, technical system components of an aircraft such as, for example, electrical supply lines, electrical data lines, optical data lines, actuators, sensors, valves, control and/or feedback control units, computer units, water and wastewater tanks, water and wastewater pipes, window and door frames, air-conditioning ducts and aeration or ventilation ducts can be directly integrated into the skin mosaic elements.

According to another advantageous enhancement of the lightweight structure, it is proposed that at least one mosaic element is realized with a peripheral frame or at least one mosaic element is realized with a base area that is bordered by a peripheral frame.

This makes it possible, among other things, to broaden the design options for the lightweight structure because it may contain frame-shaped mosaic elements (devoid of base areas) without a bottom surface, as well as mosaic elements with a base area. Mosaic elements that are realized with a base area bordered by a frame can be advantageously connected to a skin over their entire surface while frame mosaic elements that are devoid of a base area make it possible to realize, for example, sectionally open-worked lightweight structures, i.e., open lightweight structures. The closed peripheral frame also causes a sufficiently high static inherent stability of the mosaic element without the presence of a base area.

According to an advantageous embodiment of the lightweight structure, it is proposed that the mosaic elements and/or the skin mosaic elements are at least sectionally connected to a skin.

This results in a significant increase in the stability of the lightweight structure because the skin statically acts as a plate over all grouped mosaic elements and, if applicable, also the skin mosaic elements. The skin may be plane and/or at least sectionally curve one-dimensionally and/or two-dimensionally. If the mosaic elements optionally feature a base area, their material thickness preferably is significantly smaller than a material thickness of the base areas of the skin mosaic elements because the mosaic elements are preferably connected to a skin. The mosaic elements are respectively connected to one another and to the skin, wherein the mosaic elements may also be connected to adjoining or interspersed skin mosaic elements. If so required, system components with small dimensions, particularly sensors and electrical or optical lines, may also be directly integrated into the skin.

According to another advantageous embodiment of the lightweight structure, it is proposed that the base areas, as well as the frames, have a polygonal shape, particularly an equilateral triangular, an equilateral quadrangular, an equilateral pentagonal, an equilateral hexagonal or an equilateral heptagonal shape.

This makes it possible to also assemble a complex geometric lightweight structure with the aid of a plurality of mosaic and/or skin mosaic elements that respectively have a relatively simple basic geometry. The frames respectively feature a number of preferably linear, equally high, equally long and equally thick sidewalls that corresponds to the number of corners, wherein the sidewalls end flush with the base area geometry on all sides. Individual sidewalls may, if applicable, sectionally feature recesses and/or have a reduced or increased wall thickness. The frames essentially serve as reinforcing elements in accordance with the loads to be expected. Furthermore, a material thickness of the skin may locally vary in dependence on the given load profile. Alternatively, the base areas or the frames may respectively have an irregular polygonal shape or a polygonal peripheral contour, in which, for example, at least one side is at least sectionally curved inward and/or outward.

According to another advantageous embodiment of the lightweight structure, it is proposed that at least one bracket is arranged between at least two adjacent mosaic elements and the skin.

This results in a connection for system components that is realized integrally with the lightweight structure. The elaborate mounting of the thus far required large number and variety of brackets for the system components during the installation of the technical equipment of the fuselage cell ("A, B, C brackets") therefore is eliminated. In order to integrate a bracket with, for example, a T-shaped cross-sectional geometry, the base areas of two abutting mosaic or skin mosaic elements may be chamfered or realized such that they are slightly inclined upward in the region of the frames. This forms a connection for accommodating at least one bracket leg with corresponding cross-sectional geometry without voids. A frame of at least one mosaic or skin mosaic element may furthermore be realized such that it can simultaneously act as a bracket. The bracket may comprise a thermosetting or thermoplastic composite fiber polymer and/or a light alloy.

According to an enhancement of the lightweight structure, at least one reinforcing element is arranged on at least two adjacent sidewalls of at least two mosaic elements and/or at least one line extends between at least two sidewalls.

This makes it possible to further increase the mechanical load bearing capacity of the lightweight structure. The reinforcing element may comprise, for example, a reinforcing element with a U-shaped cross-sectional geometry. The lines preferably comprise electric lines and/or optical lines with small cross section.

According to another advantageous embodiment of the lightweight structure, it is proposed that at least two adjacent skin mosaic elements are joined by means of at least one connecting element, particularly at least one rivet and/or at least one bolt connection.

This makes it possible to produce a simple connection between, for example, two lightweight structures in the form of partial shells that in turn are once again composed of skin mosaic elements, namely analogous to the conventional monocoque construction of an aircraft fuselage cell such that longitudinal and/or transverse seams are created. Adjoining mosaic element can be connected accordingly.

According to another advantageous embodiment of the lightweight structure, at least one reinforcing element is arranged on at least two adjacent sidewalls of at least two skin mosaic elements.

The reinforcing element may be realized, for example, with a reinforcing profile that has a U-shaped cross-sectional geometry. The reinforcing profile encompasses both sidewalls from above and is rigidly connected thereto.

According to another advantageous embodiment of the lightweight structure, it is proposed that at least two sidewalls of at least two mosaic elements and/or two skin mosaic elements can be at least sectionally joined in a positive fashion.

In this way, the (skin) mosaic elements can be precisely put together or assembled into the lightweight structure. The positive connection can be realized, for example, by means of tongue-and-groove connection that may also be realized in an engaging fashion in order to prevent the uncontrolled separation of the assembled skin or mosaic elements. The at least sectional positive connection furthermore simplifies the alignment of the mosaic or skin mosaic elements during the assembly.

According to an enhancement of the lightweight structure, at least two positively joined sidewalls of at least two adjacent mosaic elements and/or skin mosaic elements can be fixed in position by means of at least one connecting element, particularly at least one attachable snap-on clamping element.

In this way, a position attained due to the positive connection between the (skin) mosaic elements is additionally secured in a non-positive fashion.

According to another embodiment of the lightweight structure, it is proposed that the snap-on clamping element features at least one bracket for accommodating at least one system component, particularly at least one line.

In this way, system components can be connected to the lightweight structure with the aid of the snap-on clamping element.

The mosaic elements, the skin mosaic elements and the skin of the inventive lightweight structure comprises a thermosetting and/or thermoplastic composite fiber polymer and/or a light alloy.

Due to the material invariance of the inventive lightweight structure, it can be manufactured economically and in a broad diversity of variations by means of different manufacturing processes. Thermoplastic polymers and/or thermosetting polymers (particularly epoxy resins) that are reinforced, in particular, with carbon fibers or glass fibers may be considered as composite fiber materials. Alternatively, Kevlar®-fibers, Aramid®-fibers or even natural fibers may be used for the reinforcement. The light alloys used may comprise, in particular, aluminum alloys, titanium alloys, magnesium alloys and, if applicable, special steel alloys or a combination of at least two of the aforementioned alloys. The mosaic elements, the skin mosaic elements and the skin may alternatively comprise a foamed material, particularly a foamed plastic, or a metallic foam.

According to an embodiment, the objective of the invention is furthermore attained with a method for manufacturing a lightweight structure that essentially comprises a thermosetting composite fiber material, particularly a lightweight structure as previously described, wherein the method comprises the following steps:

a) at least sectionally arranging a plurality of non-cured mosaic elements on a non-cured or a cured skin and/or arranging non-cured skin mosaic elements and/or arranging non-cured mosaic elements in order to progressively complete a predetermined three-dimensional geometry of the lightweight structure that absorbs and distributes all occurring forces in an essentially optimal fashion, and b) simultaneously or subsequently curing the mosaic elements and/or the skin and/or the skin mosaic elements in order to complete the lightweight structure.

In this way, a large-format lightweight structure can also be economically assembled of prefabricated mosaic elements and at least one skin and/or with prefabricated skin mosaic elements. The inventive mosaic concept furthermore ensures a simple handling of the components to be joined, as well as a high process reliability and dimensional accuracy. In the relevant curing methods (e.g., "co-curing" and "one-shot-curing"), the components are usually prefabricated of a (soft, non-cured) prepreg material, particularly an epoxy resin that is reinforced with carbon fibers. Prior to the curing process in step b), supplementary components such as brackets, reinforcing elements, window frames, door frames, electrical lines ("ESN =Electrical Structure Network"), optical lines, sensors, actuators, lightning protection, cabin elements, etc., may furthermore be placed between the mosaic elements and the skin and/or between the skin mosaic elements.

According to another embodiment, the objective of the invention is furthermore attained with a method for manufacturing a lightweight structure that essentially comprises a thermoplastic and/or a cured thermosetting composite fiber polymer and/or of a light alloy, particularly a lightweight structure according to one the above description, wherein the method comprises the following steps:

a) at least sectionally arranging a plurality of mosaic elements on a skin and/or arranging skin mosaic elements and/or arranging mosaic elements in order to progressively complete a predetermined three-dimensional geometry of the lightweight structure that absorbs and distributes all occurring forces in an essentially optimal fashion, and b) simultaneously or subsequently joining the mosaic elements and the skin and/or the skin mosaic elements, particularly by means of bonding, cold welding, welding, soldering, riveting, bolt connections, snap-on connections, clamped connections, interference fits, calking, flanging or a combination of at least two of the aforementioned joining techniques in order to complete the lightweight structure.

The skin and the mosaic elements that are completely cured or solid at room temperature in this variation of the method, as well as the skin, can on the one hand be handled easier with respect to the manufacturing technology than non-cured components, but on the other hand require an optimized compensation of possible tolerances and dimensional imperfections, particularly by means of one of the novel tolerance compensation methods described above. The mosaic elements that are cured in this variation of the method, as well as the skin and/or the skin mosaic elements, are arranged and joined with the aid of suitable supporting tools. Only the actual joining process is carried out in accordance with the "co-bonding" method. Thermoplastic composite fiber polymers may be joined, for example, by means of welding while thermosetting CFPs (Composite Fiber Polymers) are preferably bonded. The assembly may alternatively also be simplified by means of an at least sectional positive connection between two respective adjacent sidewalls of at least two mosaic elements and/or skin mosaic elements. The (skin) mosaic elements are rigidly joined to one another in combination with fixing their position by means of snap-on clamping elements that can be attached onto the sidewalls. It may be necessary to provide additional sealing means, in particular, if the mosaic or skin mosaic elements, as well as the skin, are not joined by means of bonding or welding.

The joining of the (skin) mosaic elements also may at least partially take place during the grouping. This may be realized, for example, by welding (skin) mosaic elements to be subsequently integrated into an at least sectionally cured mosaic structure.

In addition to the two described exemplary variations of the method, a variety of procedures may be considered—in dependence on the materials used in the respective application—for joining the skin mosaic elements and/or the mosaic elements and, if applicable, at least one skin into a finished lightweight structure.

DETAILED DESCRIPTION OF THE PREFERRED EMBODIMENTS

In the drawings, identical constructive elements are respectively identified by the same reference symbols.

Figure 1:
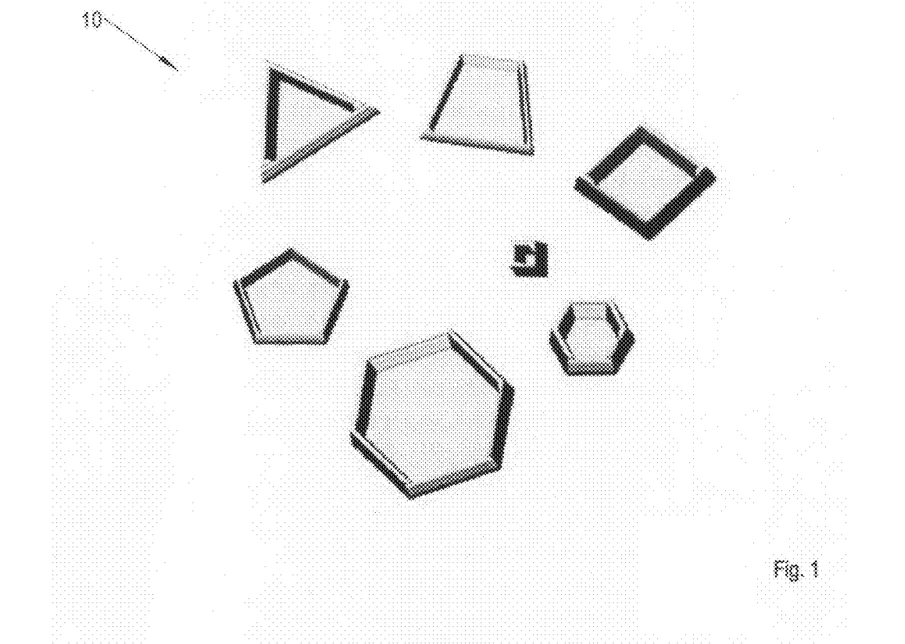
FIG. 1 shows a perspective view of mosaic elements with base areas that respectively have a different geometry and size.

FIG. 1 shows a perspective view of a plurality of different mosaic elements 10, of which a lightweight structure with any three-dimensional shape can be assembled.

The mosaic elements 10 may have a triangular, quadrangular, pentagonal or hexagonal geometry and/or be realized with different sizes as illustrated in an exemplary fashion. Polygonal geometries of the mosaic elements greater than hexagonal are also conceivable. One common aspect of all mosaic elements is that they feature a frame that is not identified in the figure and borders an optional polygonal base area that likewise is not identified. For example, the frame may have a rectangular cross-sectional geometry.

Furthermore, frame-shaped mosaic elements that are not illustrated in the figure may be at least sectionally provided within the lightweight structure. The frame-shaped mosaic elements do not feature a base area and are merely realized, for example, with a regular or irregular polygonal, peripheral frame that has, for example, a rectangular cross-sectional geometry. However, other frame geometries such as, for example, irregular polygons, if applicable, with at least one side that is at least sectionally curved inward or outward would likewise be conceivable. The frame is realized in such a way that it has a sufficient mechanical load bearing capacity at least in connection with other mosaic elements that are devoid of base areas. The inventive lightweight structure may, in principle, be composed of any combination of mosaic elements with or without base area and/or with skin mosaic elements with a thickened or reinforced base area. At least the mosaic elements with or without base area may also be at least sectionally provided with a skin.

The frame is realized with sidewalls that preferably have the same length and the number of which corresponds to the respective number of corners. The peripheral frame may, if applicable, feature recesses and/or interruptions. The base areas of the mosaic elements 10 may be plane or curved at least one-dimensionally. The mosaic elements 10 may feature a base area with varying material thickness and/or integrated reinforcing elements. Skin mosaic elements, in contrast, have an at least sectionally thickened base area, but their design is otherwise identical. Skin mosaic elements of this type make it possible to assemble a complete aircraft fuselage cell that no longer features any frames, stringers, angle brackets or skins or skin panels. A limited selection of mosaic or skin mosaic elements of different geometries and/or sizes is used for assembling the lightweight structure in order to maintain the manufacturing effort within justifiable limits.

The mosaic elements 10 or skin mosaic elements comprise, in particular, prefabricated thermoplastic and/or thermosetting composite fiber polymers and/or light alloys. The (skin) mosaic elements comprising of a thermosetting CFP may be cured or merely manufactured of a "prepreg" material, i.e., with a non-cured thermosetting CFP. It would alternatively also be possible to utilize dry fiber preforms that are not infiltrated with a thermosetting or thermoplastic polymer until the lightweight structure has been assembled. Aluminum alloys, titanium alloys or any combination thereof, in particular, may be considered as light alloys. Depending on the respective material combination, a variety of joining methods may be utilized during or after the lightweight structure is assembled of the (skin) mosaic elements.

Figure 2:
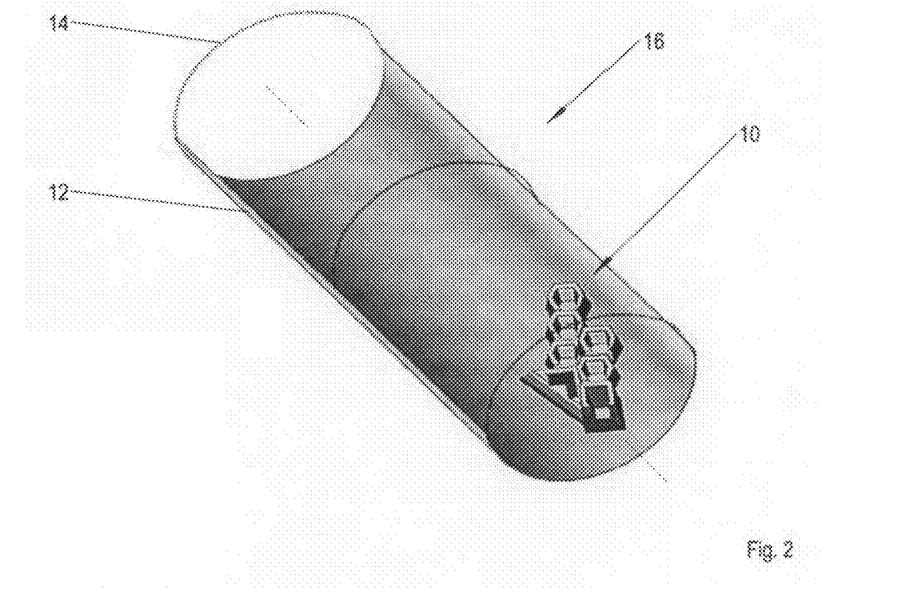
FIG. 2 shows an isometric view of one possible example of a lightweight structure in the form of a partial shell of an aircraft fuselage cell that is composed of such mosaic elements.

FIG. 2 shows an example of a lightweight structure in the form of a partial shell 12 of an aircraft fuselage cell 14 that is merely indicated in this figure, wherein the lightweight structure is composed of a plurality of joined or assembled mosaic elements 10. In this case, the mosaic elements 10 respectively feature an exemplary base area that is not identified in the figure and connected to a skin of the partial shell 12 that is likewise not identified by a reference symbol. The geometry and/or the size of the mosaic elements 10 are chosen such that the lightweight structure is able to optimally absorb and distribute all occurring forces and the mosaic elements follow a predetermined nominal geometry as precisely as possible. The mosaic construction of the lightweight structure 16 simultaneously results, among other things, in a significantly higher stability than previously known lightweight structures and in a reduced weight.

The lightweight structure 16 may, in principle, also form a complete primary aircraft structure including the airfoils, the elevator unit, the rudder unit and other components. Furthermore, the lightweight structure 16 is not limited to aeronautical applications.

Figure 3:
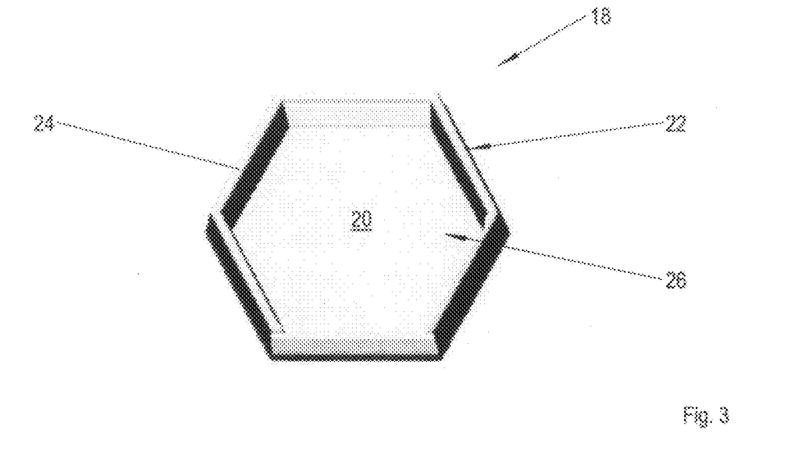
FIG. 3 shows an enlarged perspective view of a hexagonal mosaic element with a base area.

FIG. 3 shows an exemplary enlarged perspective view of a hexagonal mosaic element with a base area.

An equilateral hexagonal mosaic element 18 (polygon) is realized with a base area 20 that is bordered by a frame 22. The hexagonal frame 22 is composed of a plurality of sidewalls that have the same length—but of which only one sidewall 24 is identified by a reference symbol and representative of the remaining sidewalls. The sidewalls or the frame 22 composed thereof and the base area 20 jointly define a hexagonal trough-like depression 26. The sidewalls of the mosaic elements within the lightweight structure essentially extend in the direction of the mechanical loads to be absorbed and distributed. The geometry, size and/or arrangement of the mosaic and skin mosaic elements may be numerically determined, for example, with the FEM ("Finite Element Method"). The underside of the mosaic element 18 shown is preferably connected to a not-shown skin, for example, in order to assemble a fuselage cell of an aircraft.

Figure 4:
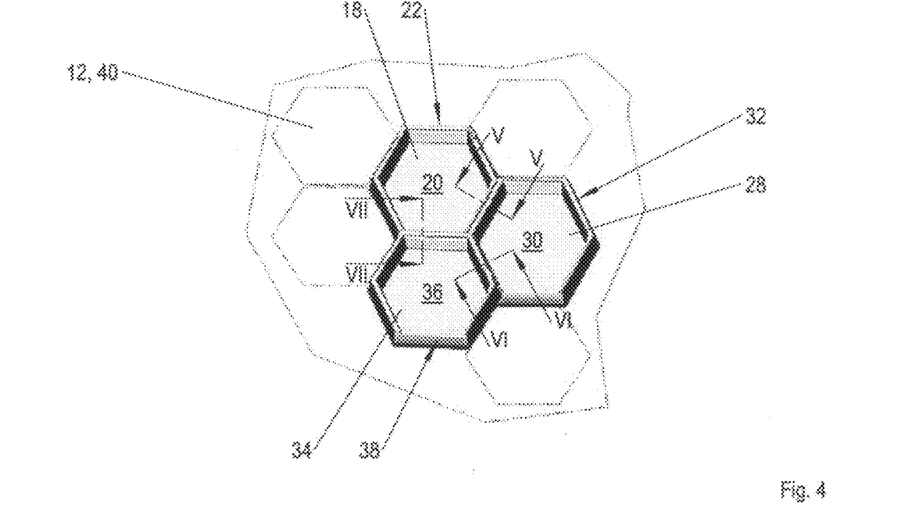
FIG. 4 shows a simplified perspective view of three joined mosaic elements with base areas.

FIG. 4 shows the assembly of a lightweight structure using the example of three equilateral hexagonal mosaic elements. The six sidewalls of the respective frames 22, 32, 38 of the three mosaic elements 18, 28, 34 are not individually identified in order to provide a better overview and connected, for example, into a honeycomb-like structure by means of a suitable joining method. A plurality of mosaic elements is arranged and joined in order to create a large-format lightweight structure such as, for example, a partial shell. The joining may be realized, for example, by jointly curing the mosaic elements 18, 28, 34 comprising a curable thermosetting CFP (prepreg material) after they were grouped accordingly. In addition, the underside of the hexagonal base areas 20, 30, 36 is connected to a skin 40 in order to form the exemplary partial shell 12. The skin 40 serves, among other things, for mechanically stabilizing the joined mosaic elements 18, 28, 34, as well as for accommodating lightning strike protection ("LSP =Lightning Strike Protection") in the form of a copper mesh ("mesh").

Figure 5:
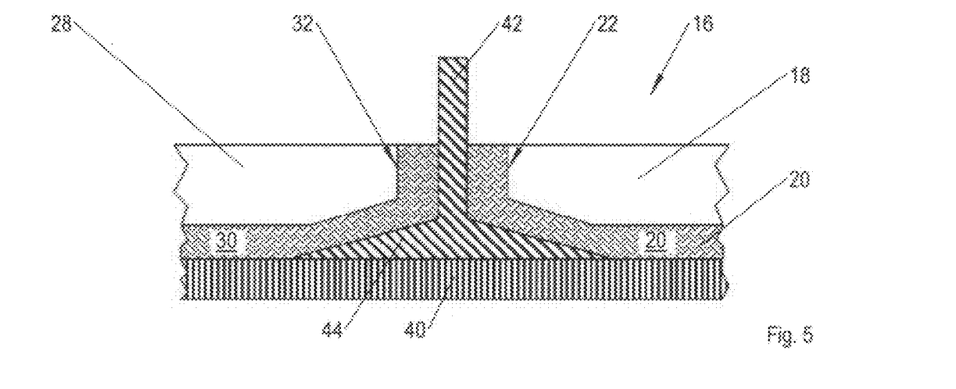
FIG. 5 shows a cross section along the line of section V-V in FIG. 4 with an integrated bracket for connecting system components.

FIG. 5 shows the integration of a bracket in a simplified cross section along the line of section V-V in FIG. 4.

A bracket 42 with approximately T-shaped cross-sectional geometry is arranged between the frames 22, 32, for example, in order to connect a system component. Any reinforcing element also may be embedded between the mosaic elements 18, 28 and the skin 40 instead of the bracket 42 or in addition thereto. In the region of the edges 22, 32 of the mosaic elements 18, 28, the base areas 20, 30 are respectively realized such that they are inclined or extend obliquely upward in order to accommodate a bracket leg 44 without voids. The skin 40 covers the bracket leg 44, as well as undersides of the mosaic elements 18, 28 that are not identified. The bracket 42 may comprise an arbitrary CFP and/or of a light alloy.

Figure 6:
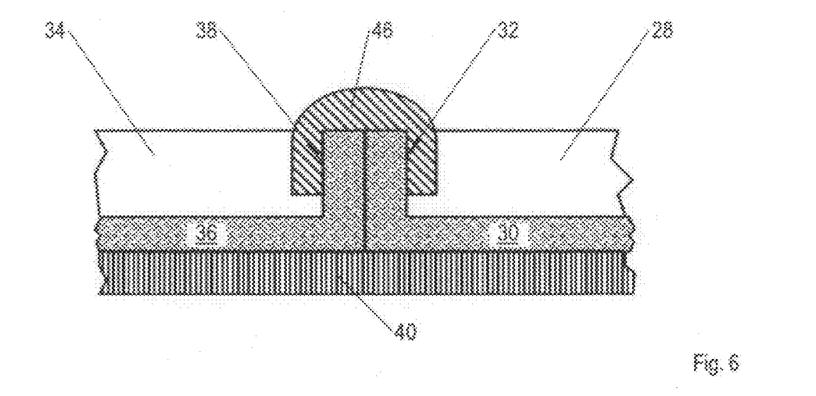
FIG. 6 shows a cross section along the line of section VI-VI in FIG. 4 with a reinforcing element.

FIG. 6 shows a cross section along the line of section VI-VI in FIG. 4 with a reinforcing element.

A reinforcing element 46 with an exemplary U-shaped cross-sectional geometry is at least sectionally arranged on two sidewalls of the frames 32, 38 of the mosaic elements 28, 34 that are not identified and respectively connected or joined. The reinforcing element 46 may be connected to the sidewalls by means of any joining method. For example, the reinforcing element 46 may be bonded, welded, riveted or bolted to the sidewalls. In order to further increase the mechanical load bearing capacity of the lightweight structure assembled in a mosaic-like fashion, the base areas 30, 36 of the mosaic elements 28, 34 are connected on their underside by means of the skin 40.

Figure 7:
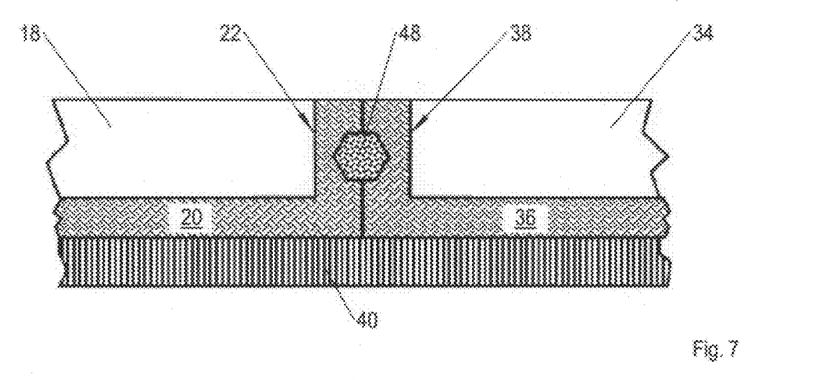
FIG. 7 shows a cross section along the line of section VII-VII in FIG. 4 with a line.

FIG. 7 shows a schematic cross section along the line of section VII-VII in FIG. 4, as well as the integration of a line, particularly an electrical or optical line, into the lightweight structure. In order to realize an integration of the line 48 that ideally contains no voids, the abutting and connected sidewalls of the frames 22, 38 respectively feature a groove that is not identified in the figure, wherein the cross-sectional geometries of the grooves jointly correspond as precisely as possible to a cross-sectional geometry of the line 48 to be accommodated. In this case, the grooves jointly form a hexagonal cross-sectional geometry that ideally makes it possible to accommodate or integrate the line 48 without voids. In order to further increase the mechanical load bearing capacity of the lightweight structure assembled in a mosaic-like fashion, the base areas 20, 36 of the mosaic elements 28, 34 are also connected to the skin 40.

If so required, the options for integrating a bracket, a reinforcing element and a line into the lightweight structure that are illustrated in an exemplary fashion in FIGS. 5 to 7 may also be combined with one another.

Figure 8:
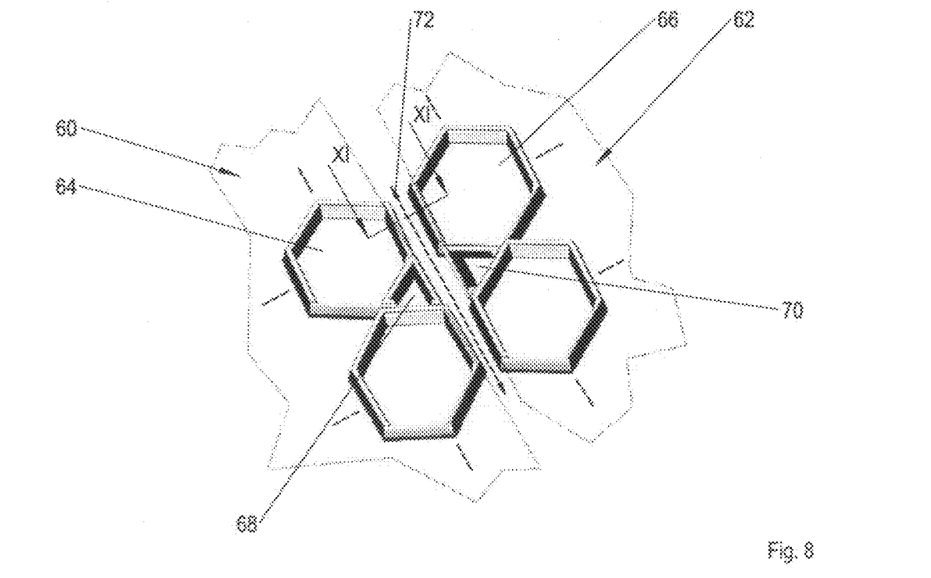
FIG. 8 shows a schematic perspective representation of two groups of skin mosaic elements that respectively comprise three interconnected skin mosaic elements.

FIG. 8 shows a schematic detail of two lightweight structures that are realized, for example, in the form of partial shells of an aircraft fuselage cell that are not illustrated in their entirety.

In this case, two partial shells 60, 62 are assembled of a plurality of interconnected skin mosaic elements, of which only three skin mosaic elements are illustrated in the figure. In contrast to the "simple" mosaic elements, in particular, according to FIGS. 3 to 7, the base areas of the skin mosaic elements, in particular, have such a high inherent rigidity that a lightweight structure assembled thereof also has a sufficient mechanical load bearing capacity without a skin. This figure shows only two hexagonal skin mosaic elements 64, 66 and two triangular skin mosaic elements 68, 70 that are representative of the remaining not-shown skin mosaic elements.

The material thickness of the base areas of the skin mosaic elements that are not identified in this figure is chosen such that the skin mosaic elements assembled into the partial shells 60, 62 can additionally fulfill the static function of the skin of a typical aircraft fuselage cell. Due to the missing skin, the possibly required lightning strike protection is directly integrated into the base areas of the skin mosaic elements. The triangular skin mosaic elements 68, 70 are respectively fitted into intermediate spaces between the hexagonal skin mosaic elements 64, 66 in such a way that a linear imaginary joining line 72 is adjusted. The arrangement of the skin mosaic elements 64-70 periodically continues to both sides of the joining line. The partial shells 60, 62 can then be connected, preferably without overlap, along this joining line 72 by means of suitable conventional joining methods such that longitudinal and/or transverse seams are created—analogous to the conventional monocoque construction of an aircraft fuselage cell. FIG. 8 merely shows an exemplary "linear" connection between the partial shells 60, 62. However, curved connecting lines between at least two partial shells would alternatively also be conceivable if the peripheral contours of the skin mosaic elements extend in a correspondingly curved fashion.

Figure 9:
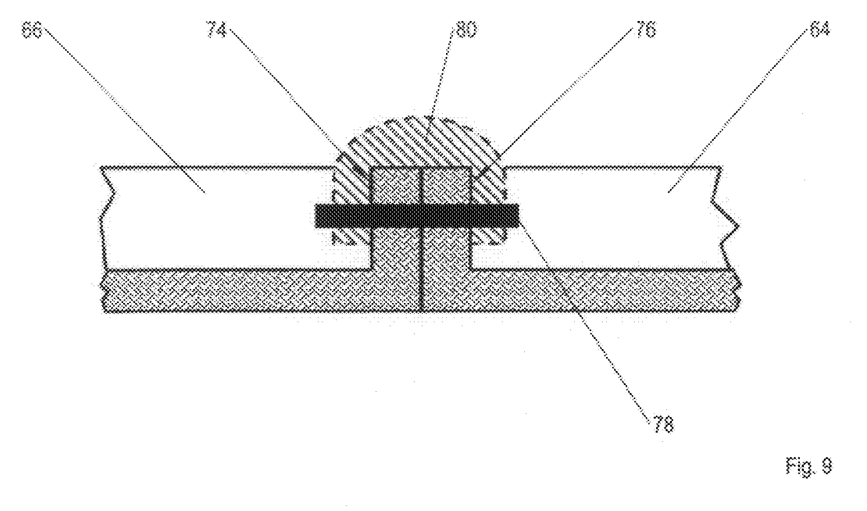
FIG. 9 shows a cross section along the line of section IX-IX in FIG. 8 with a connecting element and a facultative reinforcing element.

FIG. 9 shows a cross section along the line of section IX-IX in FIG. 8.

Two sidewalls 74, 76 of frames of the two skin mosaic elements 64, 66 that are not identified in this figure are joined or connected to one another edge-to-edge. The joining may be realized—in dependence on the material composition of the skin mosaic elements 64, 66—by means of suitable joining techniques such as, for example, bonding or welding. Alternatively, it would also be possible, for example, to cure and thusly connect two skin mosaic elements 64, 66 that comprise a non-cured thermosetting CFP (prepreg material), for example, with the aid of suitable molding tools and under the influence of pressure and/or heat. In this case, a skin that is connected to the underside of the skin mosaic elements 64, 66 is no longer required due to the high inherent stability of the skin mosaic elements 64, 66. Among other things, this results in a significantly simplified manufacture of lightweight structures comprising skin mosaic elements. The sidewalls 74, 76 are connected by means of a connecting element, particularly by means of at least one bolt and/or at least one rivet 78, in order to ensure, in particular, the mechanical load bearing capacity and the failure safety of the connection. In order to further optimize the mechanical load bearing capacity, an optional reinforcing element 80 may be at least sectionally arranged on the upper side of the sidewalls 74, 76. The optional reinforcing element 80 has an approximately U-shaped cross-sectional geometry and is connected to the sidewalls 74, 76 by means of conventional joining techniques, as well as additionally penetrated by the rivet 78 in this case.

Figure 10:
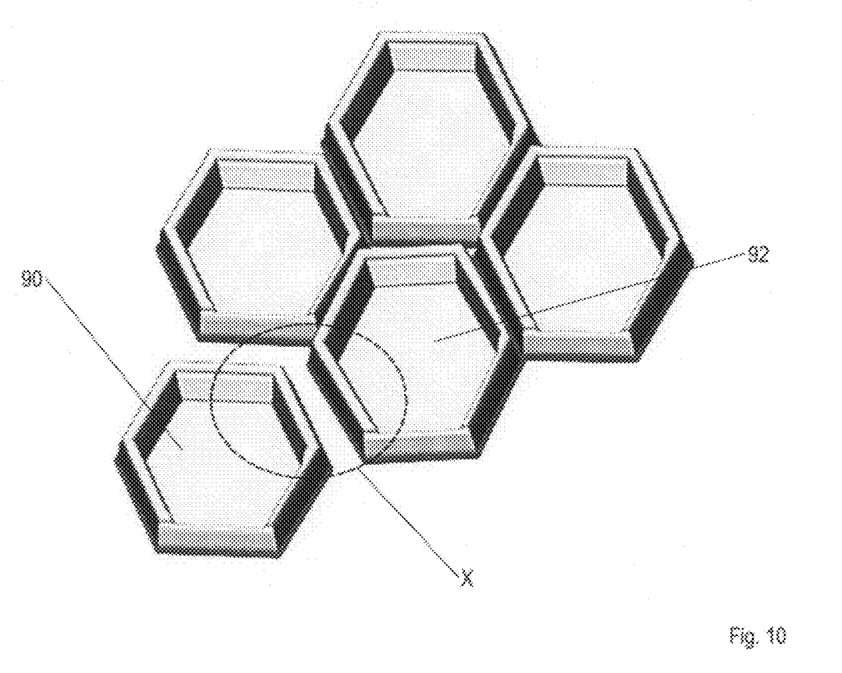
FIG. 10 shows a group of four skin mosaic elements that are already positively connected and a skin mosaic element yet to be joined thereto.

FIG. 10 shows a perspective view of a group of four hexagonal skin mosaic elements that are connected by means of a combined positive and non-positive connection, as well as another hexagonal skin mosaic element yet to be joined thereto. The skin mosaic element 90 should be attached to the skin element 92 in the direction of the white arrow that is not identified in this figure in order to complete the group of skin mosaic elements. In contrast to the preferably bonded, welded, riveted or bolted (skin) mosaic elements according to FIGS. 4 to 9, the joining is in this case realized by means of a combined positive and non-positive connection. A window integration can be realized, for example, with a not-shown hexagonal skin mosaic element, in the base area of which a window cutout for accommodating a window frame is at least sectionally arranged. A window integration may alternatively also be realized with a special "window" skin mosaic element of suitable size that is placed between adjacent mosaic elements and the base area of which at least sectionally comprises a transparent material.

Figure 11:
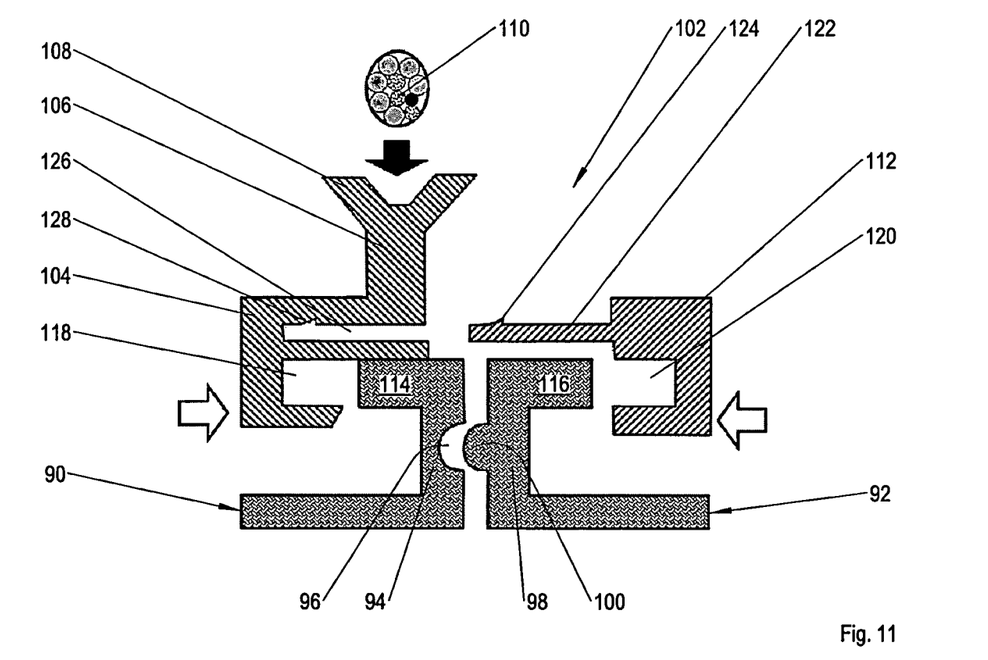
FIG. 11 shows a cross section in the region of the detail X according to FIG. 10 with the two not yet connected mosaic elements and an open snap-on clamping element.
Figure 12:
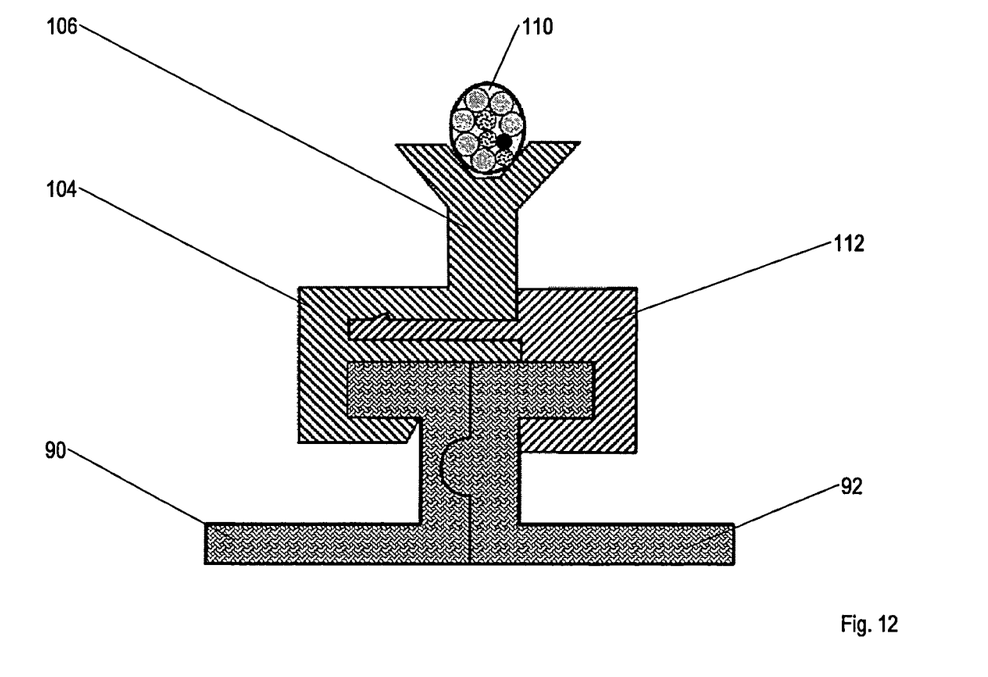
FIG. 12 shows a cross section through the two mosaic elements according to FIG. 11 that are connected by means of a positive connection and an attached snap-on clamping element.

FIGS. 11 and 12—to both of which the following portion of the description refers at once—show a simplified cross section in the region of the detail X according to FIG. 10, wherein FIG. 11 shows the skin mosaic elements in the unconnected state and FIG. 12 shows the skin mosaic elements in the assembled, rigidly connected state.

A groove 96 is arranged in a sidewall 94 of a frame of the skin mosaic element 90 that is not identified in this figure while a tongue 100 is arranged in the region of a sidewall 98 of the skin mosaic element 92 to be attached. In the exemplary embodiment, the groove 96 and the tongue 100 have semicircular cross-sectional geometries that correspond to one another in such a way that the tongue 100 can be positively inserted into the groove 96. The positive connection between the skin mosaic elements 90, 92 significantly simplifies, among other things, the alignment and the assembly during the manufacture of a lightweight structure comprising a plurality of (skin) mosaic elements. In order to further simplify the assembly, the groove 96 and the tongue 100 may be realized such that a non-positive connection in the form of an engaging clamped connection is produced in addition to the positive connection.

In order to increase the mechanical load bearing capacity and to secure the position of the skin mosaic elements 90, 92, a combined snap-on and clamping element 102 is provided and can be respectively snapped on or attached to the sidewalls 94, 98. The snap-on and clamping element 102 comprises a (first) housing part 104 with an integrally designed bracket 106 that features a fork-shaped (Y-shaped) receptacle 108 for mounting a system component such as, for example, an electrical or optical line 110 and another (second) housing part 112. The sidewalls 94, 98 respectively feature an inwardly directed flange 114, 116 in order to attach the snap-on clamping element 102 to the sidewalls 94, 98 of the skin mosaic elements 90, 92. The two housing parts 104, 112 of the combined snap-on and clamping element 102 respectively feature two recesses 118, 120 with an approximately rectangular cross-sectional geometry that preferably can be attached to the flanges 114, 116 with a slight press fit.

In order to ensure a durable connection between the housing parts 104, 112, the housing part 112 features a snap-in connection that is not identified in this figure. The pin 122 has, for example, a square cross-sectional geometry and preferably can be inserted into a correspondingly designed recess 126 of the housing part 104 with a slight press fit, wherein the barb 124 respectively snaps or engages into a small wedge-shaped depression 128 within the recess 126 in the completely inserted state. In this way, a rigid connection is produced between the housing parts 104 and 112 of the snap-on clamping element 102 and therefore the sidewalls 94, 98 of the skin mosaic elements 90, 92. The snap-in connection essentially comprises the pin 122 with the barb 124 and the recess 126 with the wedge-shaped depression 128.

In the state illustrated in FIG. 12, the two skin mosaic elements 90, 92 are connected to one another by means of a combined positive and non-positive connection that can be produced in a simple and time-saving fashion by connecting the skin mosaic elements in the direction of the white arrows and does not separate independently. The line 110 or at least one other system component can ultimately be snapped into the fork-shaped recess 108 of the snap-on and clamping element 102 in the direction of the black arrow. For this purpose, the receptacle 108 features not-shown retaining elements such as, for example, small retaining arms, retaining clamps or the like that preferably engage automatically when the line 110 is pressed into the receptacle 108.

In the first variation of the method, mosaic elements that preferably comprise a non-cured thermosetting CFP and/or at least one skin and/or skin mosaic elements are in step a) progressively arranged in order to manufacture a given lightweight structure and jointly cured in a suitable tool or molding tool under the influence of pressure and/or heat. The curing in step b) is carried out in the form of a "co-curing" process or a "one-shot curing" process. Prior to the curing process, supplementary components may be placed between the mosaic elements and the skin and/or between the skin mosaic elements. For the curing process, the assembled lightweight structure is, for example, deposited on a molding tool that is open on one side, overlaid with ventilation layers, separation layers and other functional layers and ultimately covered with a vacuum film. The entire assembly is then transported into an autoclave in order to be cured under the influence of pressure and/or heat. Alternatively, the assembled lightweight structure may be placed into a heated molding tool that is closed on all sides in order to be cured. In order to optimize the connection, it may be advantageous to additionally apply an adhesive between the components to be joined. Alternatively, the components to be joined may be at least sectionally provided with an adhesive.

In an alternative approach, the lightweight structure can be at least partially assembled of mosaic elements and/or at least one skin and/or skin mosaic elements that comprise dry fiber preforms. In order to complete the lightweight structure assembled of these fiber preforms, the assembly is transported into a molding tool that is closed on all sides and infiltrated with a thermoplastic or thermosetting resin therein by means of conventional (resin) infusion methods (e.g., "LRI=Liquid Resin Infusion"). After the cooling or curing process, the lightweight structure can be removed and, if applicable, subjected to required post-processing steps. Supplementary components can be placed into the assembly prior to the infiltration with the polymer that is not cured and plasticized due to the heating process. During the assembly of the mosaic elements on the skin and/or the skin mosaic elements and/or, if applicable, the frame-shaped mosaic elements, it may be necessary to deposit the individual fiber preforms on a suitable positioning frame and/or to at least sectionally sew, tack and/or bond the fiber preforms to one another in order to fix their position. The mosaic elements, the skin mosaic elements and the possibly existing skin may be deposited on the outside or the inside of the positioning frame in this case.

It is furthermore possible to at least partially carry out steps a) and b) simultaneously, i.e., the (skin) mosaic elements and/or the skin may already be connected to one another during their arrangement, for example, by means of local curing.

In a second variation of the method, mosaic elements are three-dimensionally arranged on at least one skin and/or skin mosaic elements and/or frame-shaped mosaic elements of an already cured thermosetting CFP, a thermoplastic CFP or a light alloy on a suitable supporting tool. Subsequently, the thusly placed (skin) mosaic elements are connected to one another in step b) by means of a suitable and, in particular, material-dependent joining method. The (skin) mosaic elements may also be arranged and joined simultaneously in this case. In this variation of the method, it is preferred to use thermoplastic and/or thermosetting CFPs and/or light alloys such as, for example, titanium alloys or aluminum alloys that are in a solid state of aggregation at room temperature. The joining is only carried out in accordance with the "co-bonding" method during bonding processes.

If the solid mosaic elements and/or skin mosaic elements can be joined to one another, for example, by means of engaging plug-type connections (see, in particular, FIGS. 10 to 12), a supporting tool may under certain circumstances be unnecessary because the mosaic elements can be supported on a likewise solid skin and the skin mosaic elements are mutually braced and held together. Supplementary components may be integrated into the assembly prior to the joining process. The joining process itself is realized, in particular, by means of bonding, thermoplastic welding, ultrasonic welding, laser beam welding, soldering or riveting. Furthermore, any suitable snap-on and clamped connections may be arranged on the sidewalls of the positively connected mosaic elements and/or skin mosaic elements in order to achieve a bond with sufficient mechanical strength.

In a third variation of the method, the mosaic elements and/or the skin mosaic elements comprising, for example, a non-cured thermosetting CFP ("prepreg" material) and are successively arranged in a matrix and/or placed on a skin of a cured thermosetting CFP. The (skin) mosaic elements may optionally comprise a thermoplastic CFP and/or a light alloy. Subsequently, local curing of the (skin) mosaic elements, i.e., locally limited curing, is carried out in accordance with the "in-situ curing" method in an intermediate step. Locally limited selective curing of individual regions can be realized, for example, by means of UV light, infrared radiation or microwave radiation. During this process, the mosaic elements connect to the skin and the skin mosaic elements connect to one another and, if applicable, to the mosaic elements. If so required, an adhesive may have to be introduced between the components to be joined. Supplementary components may also be integrated into the structure in advance.

In the case of a non-cured skin of a thermosetting CFP, a final curing process in the form of the "two-step curing" method is usually required in order to completely finish the lightweight structure. This optional step is generally not carried out on an already cured skin of a thermosetting CFP and/or a thermoplastic CFP and/or a light alloy.

In case the mosaic elements and/or the at least one skin and/or the skin mosaic elements are manufactured of a thermoplastic CFP and/or a light alloy, other joining techniques such as, for example, bonding, welding, soldering or riveting may be used for connecting the components into the mosaic-like lightweight structure.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE SYMBOLS

10. Mosaic elements
12. Partial shell
14. Aircraft fuselage cell
16. Lightweight structure
18. Mosaic element
20. Base area (mosaic element)
22. Frame 24. Sidewall
26. Depression
28. Mosaic element
30. Base area
32. Frame
34. Mosaic element
36. Base area
38. Frame
40. Skin
42. Bracket
44. Bracket leg
46. Reinforcing element
48. Line (electrical/optical)
60. Partial shell
62. Partial shell
64. Skin mosaic element (hexagonal)
66. Skin mosaic element (hexagonal)
68. Skin mosaic element (triangular)
70. Skin mosaic element (triangular)
72. Joining line
74. Sidewall
76. Sidewall
78. Rivet
80. Reinforcing element
90. Skin mosaic element (hexagonal)
92. Skin mosaic element (hexagonal)
94. Sidewall
96. Groove (sidewall)
98. Sidewall
100. Tongue (sidewall)
102. Snap-on clamping element
104. Housing part (bracket)
106. Bracket (system component)
108. Receptacle
110. Line
112. Housing part
114. Flange
116. Flange
118. Recess
120. Recess
122. Pin
124. Barb
126. Recess
128. Depression

The invention claimed is:

1. A lightweight structure, wherein the lightweight structure is at least sectionally composed of a plurality of elements connected with each other comprising at least one of individual mosaic elements and individual skin mosaic elements, wherein the at least one of mosaic elements and skin mosaic elements each feature a base area that is bordered by a peripheral frame of the base defining closed geometric structures, which are individually joined to each other by an at least sectional connection between at least two respective adjacent sidewalls of their peripheral frames parallel to their base areas wherein the mosaic elements and the skin mosaic elements are at least sectionally connected to a skin and wherein at least one bracket is arranged between at least two adjacent mosaic elements and the skin.

2. The lightweight structure according to claim 1, wherein at least one of an arrangement, geometry and size of, the at least one of the mosaic elements and the skin mosaic elements vary in order to achieve an essentially optimal absorption and distribution of all occurring forces.

3. The lightweight structure according to claim 1, wherein the base areas, as well as the frames, have a polygonal shape.

4. The lightweight structure according to claim 3, wherein the polygonal shape of the frames comprises at least one of an equilateral triangular, an equilateral quadrangular, an equilateral pentagonal, an equilateral hexagonal or an equilateral heptagonal shape.

5. The lightweight structure according to claim 1, wherein at least one reinforcing element is arranged on at least two adjacent sidewalls of at least two mosaic elements.

6. The lightweight structure according to claim 1, wherein at least one line extends between at least two sidewalls.

7. The lightweight structure according to claim 1, wherein at least two sidewalls of at least two mosaic elements or two skin mosaic elements are at least sectionally joined in a positive fashion.

8. The lightweight structure according to claim 7, wherein at least two positively joined sidewalls of at least two adjacent mosaic elements or skin mosaic elements are fixed in position by means of at least one connecting element.

9. The lightweight structure according to claim 8, wherein the at least one connecting element comprises a snap-on clamping element and the snap-on clamping element features at least one bracket for accommodating at least one system component.

* * * * *